(12) United States Patent
Arnold et al.

(10) Patent No.: US 10,261,982 B2
(45) Date of Patent: Apr. 16, 2019

(54) ASYNCHRONOUS EXECUTION OF ANIMATION TASKS FOR A GUI

(71) Applicant: Facebook, Inc., Menlo Park, CA (US)

(72) Inventors: Robert Douglas Arnold, San Francisco, CA (US); Denis Koroskin, Redwood City, CA (US); Jonathan M. Kaldor, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 240 days.

(21) Appl. No.: 15/430,193

(22) Filed: Feb. 10, 2017

(65) Prior Publication Data

US 2017/0154014 A1  Jun. 1, 2017

Related U.S. Application Data

(63) Continuation of application No. 14/572,289, filed on Dec. 16, 2014, now Pat. No. 9,569,062, which is a continuation-in-part of application No. 14/284,304, filed on May 21, 2014.

(51) Int. Cl.
| | |
|---|---|
| *G06F 3/0481* | (2013.01) |
| *G06F 17/22* | (2006.01) |
| *G06F 3/0485* | (2013.01) |
| *G06Q 50/00* | (2012.01) |
| *G06F 3/0488* | (2013.01) |
| *G06T 13/00* | (2011.01) |
| *H04W 4/18* | (2009.01) |

(52) U.S. Cl.
CPC ........ *G06F 17/2241* (2013.01); *G06F 3/0481* (2013.01); *G06F 3/0485* (2013.01); *G06F 3/04883* (2013.01); *G06Q 50/01* (2013.01); *G06T 13/00* (2013.01); *H04W 4/18* (2013.01); *H04W 4/185* (2013.01)

(58) Field of Classification Search
CPC ........................ G06F 17/2241; G06F 3/0481
USPC ........................................................ 715/854
See application file for complete search history.

(56) References Cited

U.S. PATENT DOCUMENTS

| | | | | |
|---|---|---|---|---|
| 7,284,195 B2* | 10/2007 | Bates | ................. | G06F 17/2241 715/206 |
| 8,042,065 B2* | 10/2011 | Wong | ................. | G06F 17/2241 707/805 |
| 9,223,461 B1* | 12/2015 | Brown | ................. | G06F 3/0485 |
| 9,230,356 B2* | 1/2016 | Chan | ...................... | G06T 13/00 |
| 9,274,766 B2* | 3/2016 | Arnold | .................... | G06F 8/38 |
| 9,542,366 B2* | 1/2017 | Lee | ..................... | G06F 17/2241 |
| 9,569,062 B2* | 2/2017 | Arnold | ................. | G06F 3/0481 |

(Continued)

*Primary Examiner* — William D Titcomb
(74) *Attorney, Agent, or Firm* — Baker Botts L.L.P.

(57) ABSTRACT

Particular embodiments of a computing device may provide a main thread, a graphics thread to handle tasks related to rendering and presenting a graphical user interface (GUI), and an input thread to handle tasks related to processing input-related events. The GUI may comprise at least one animated component associated with a set of state variables. The main thread may handle tasks to generate a GUI hierarchy and provide copies of the GUI hierarchy to the input thread and the graphics thread. The input thread may handle tasks to initialize and update the state variables and provide information about the state variables to the graphics thread. The graphics thread may then handle tasks to update the GUI by rendering a first frame of the animation based on the state variables.

20 Claims, 13 Drawing Sheets

(56) References Cited

U.S. PATENT DOCUMENTS

| | | | | |
|---|---|---|---|---|
| 9,977,683 | B2* | 5/2018 | Arnold | G06F 9/451 |
| 2004/0113953 | A1* | 6/2004 | Newman | G06F 3/0483 |
| | | | | 715/853 |
| 2007/0112832 | A1* | 5/2007 | Wong | G06F 3/0481 |
| 2011/0087989 | A1* | 4/2011 | McCann | G06F 3/04817 |
| | | | | 715/772 |
| 2011/0138338 | A1* | 6/2011 | Glasgow | G06F 17/2241 |
| | | | | 715/853 |
| 2011/0166851 | A1* | 7/2011 | LeBeau | G06F 17/273 |
| | | | | 704/9 |
| 2012/0260195 | A1* | 10/2012 | Hon | G06F 17/30058 |
| | | | | 715/753 |
| 2013/0120401 | A1* | 5/2013 | Borysenko | G06T 13/80 |
| | | | | 345/473 |
| 2013/0194269 | A1* | 8/2013 | Matas | G06T 11/60 |
| | | | | 345/426 |
| 2013/0198664 | A1* | 8/2013 | Matas | G06T 11/60 |
| | | | | 715/765 |
| 2014/0215360 | A1* | 7/2014 | Degani | G06F 3/0481 |
| | | | | 715/753 |
| 2015/0304521 | A1* | 10/2015 | Campanelli | G06K 15/1889 |
| | | | | 358/1.18 |
| 2015/0339033 | A1* | 11/2015 | Arnold | G06F 3/04842 |
| | | | | 715/854 |

* cited by examiner

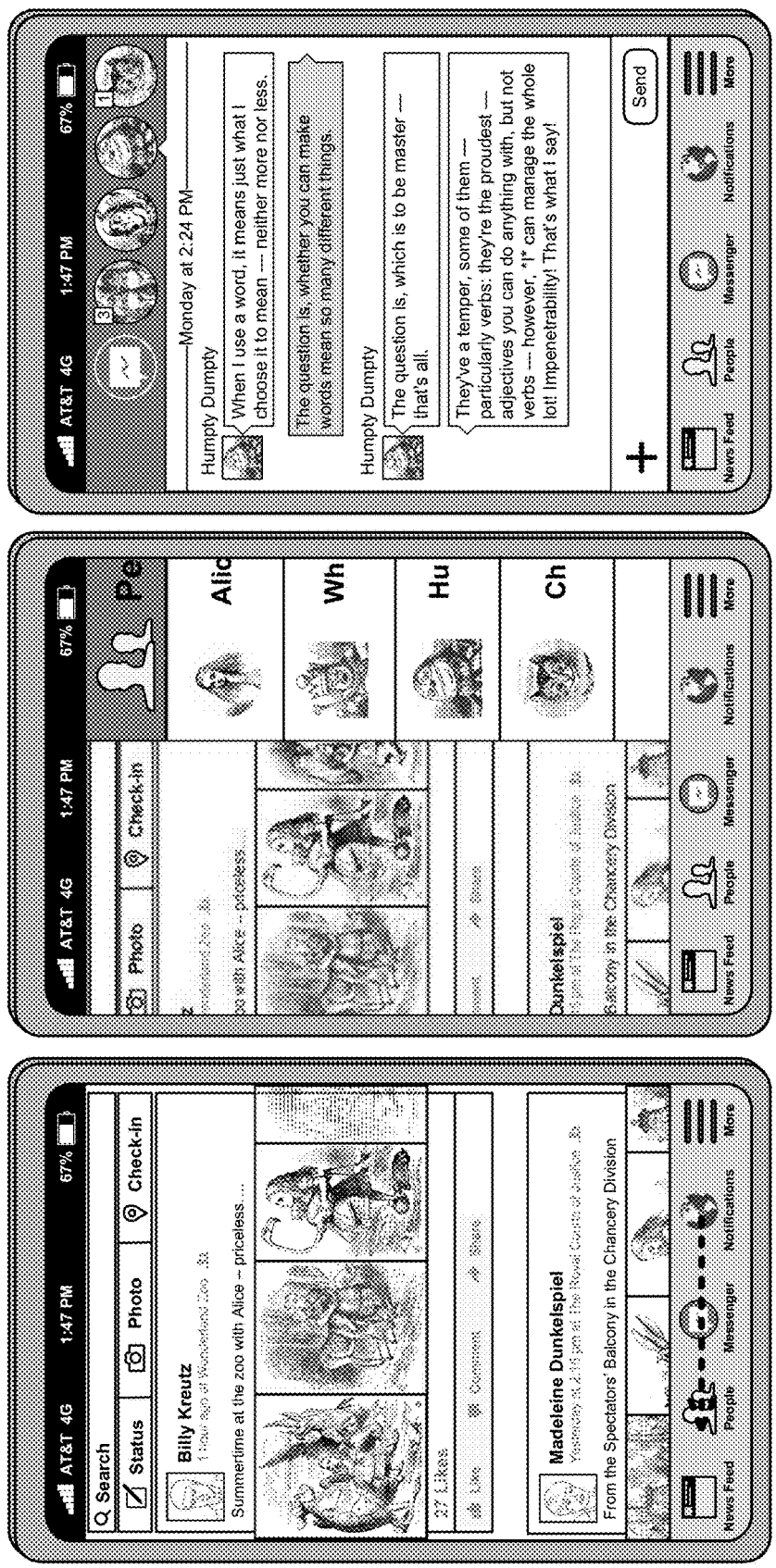

ASYNCHRONOUS EXECUTION OF ANIMATION TASKS FOR A GUI

PRIORITY

This application is a continuation under 35 U.S.C. § 120 of U.S. patent application Ser. No. 14/572,289, filed 16 Dec. 2014, which is a continuation-in-part under 35 U.S.C. § 120 of U.S. patent application Ser. No. 14/284,304, filed 21 May 2014, both of which are incorporated herein by reference in their entirety.

TECHNICAL FIELD

This disclosure generally relates to handling graphical user interfaces.

BACKGROUND

A computing device may render a graphical user interface (GUI) for display. In some cases, it may be possible to interact with certain components of a GUI. The view displayed by the GUI (and therefore, the particular set of components comprising the GUI) may change as user input is received in relation to interactive components of the GUI (e.g., through a gesture, such as scrolling or clicking/tapping).

Conventionally, all instructions for any particular application may be handled by a single thread (i.e., the main execution thread). A significant portion of the instructions handled by the main execution thread may include generating and/or updating a view of a GUI for the application, as well as handling user input received in relation to particular components of the GUI. Latency attributable to GUI-related input (e.g., processing touch sensor data to identify a gesture) and output (i.e., updating the GUI in response to received user input) tasks may increase significantly as the GUI becomes more complex (e.g., when animations are presented in the GUI) and/or as particular components of the GUI become more expensive to render.

SUMMARY

Particular embodiments provide various techniques for asynchronous execution of instructions for an application using a multi-threaded approach to outsource input/output (I/O)-handling tasks from a main thread to an input-handling thread and a graphics thread. Particular embodiments may use (1) the main thread to handle execution of instructions to generate a hierarchy of layers representing a GUI, wherein each layer represents a logical grouping of components of the GUI, (2) the input thread to handle asynchronous execution of instructions to process user input based on interactions with the GUI, and (3) the graphics thread to handle asynchronous execution of instructions to generate and/or update display output in relation to one or more layers of the GUI hierarchy.

Certain tasks may be handled by an animation engine executing within the context of the input thread, such as, by way of example and not limitation: tracking animation-state variables for animated GUI components, calculating updated values for the animation-state variables, and handling user input that triggers or affects animation within the GUI. Such user input may include recognizing user input types and handling tasks based on the type of animation to which the user input is applied. Certain tasks handled by the animation engine may be variously performed by the input thread, the graphics thread, and the main thread.

These techniques may result in a reduction in latency associated with generating and/or updating a view of a GUI for the application, as well as a reduction in latency associated with handling user input received in relation to particular components of the GUI.

Particular embodiments may be implemented on any platform that follows the Model View ViewModel (MVVM) architectural pattern, in which a clear separation is facilitated between software instructions related to the GUI and software instructions related to business logic.

BRIEF DESCRIPTION OF THE DRAWINGS

FIGS. 1G-L illustrate updated views of the example GUI of FIG. 1A after receiving user input to scroll horizontally through tabs.

DESCRIPTION OF EXAMPLE EMBODIMENTS

Figure 1A:
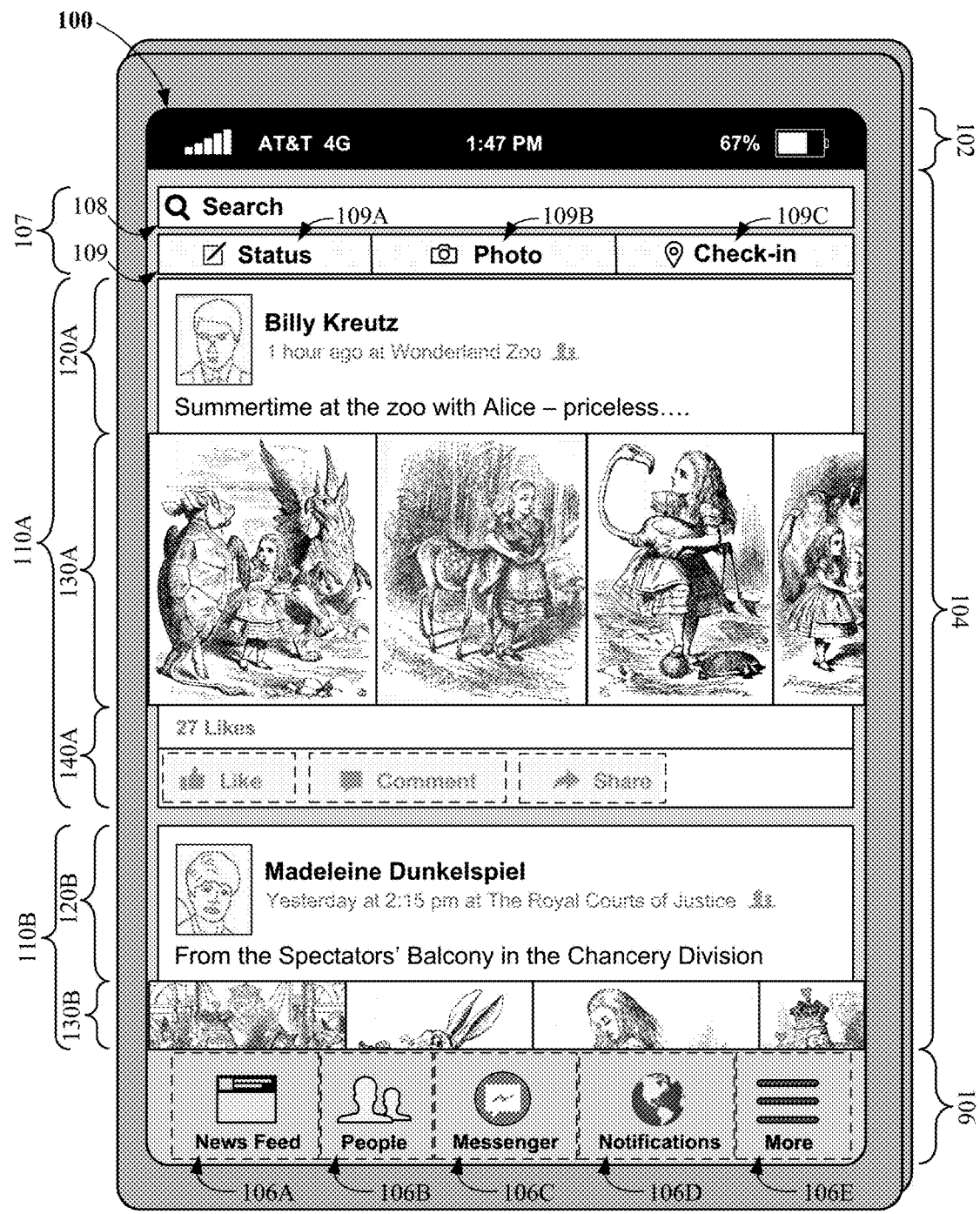
FIG. 1A illustrates an example GUI for a newsfeed with interactive components.

In particular embodiments, various techniques are provided for asynchronous execution of instructions for an application using a multi-threaded approach to outsource input/output (I/O)-handling tasks from a main thread to an input-handling thread and a graphics thread. Particular embodiments may use (1) the main thread to handle business logic, including execution of instructions to generate a hierarchy of layers representing a graphical user interface (GUI), wherein each layer represents a logical grouping of components of the GUI, (2) the input thread to handle asynchronous execution of instructions to process user input based on interactions with the GUI, and (3) the graphics thread to handle asynchronous execution of instructions to generate and/or update display output in relation to one or more layers of the GUI hierarchy. User input processed by the input thread is then passed to both the main thread and the graphics thread, so that the graphics thread may begin immediately updating the GUI without waiting for the user input to the processed by the main thread.

In particular embodiments, an animation engine may execute within the context of the input thread to handle certain animation-related tasks, such as, by way of example and not limitation: calculating animation state, tracking animation-state variables, and, by way of copying the input tree to memory reserved for the graphics thread, providing rendering instructions for animations. The graphics thread may handle rendering of frames for the animations in accordance with instructions provided by the input thread and in accordance with the frame rate. In particular embodiments, the main thread may still perform the initial setup of the animation environment, e.g., when a gesture triggers an animation. After that initial step, however, all animation-related operations (for the newly-triggered animation) are handled by the animation engine. In particular embodiments, the animation engine may be able to determine (e.g., by identifying and classifying) particular types of user input received with respect to animations, calculate and update animation-state variables accordingly, and thereby instruct the graphics thread and/or the main thread appropriately. Particular embodiments of this multi-threaded model for handling execution of tasks may thereby enable smoother animations, provide quicker GUI response time to user input received with respect to animations, and facilitate interactive features for animated GUI components (e.g., by handling tasks to trigger or conclude an animation or to temporarily or permanently modify an animation).

In particular embodiments, components of a GUI may be organized into logical groupings organized as a hierarchy of layers in the GUI. The GUI hierarchy may be represented by a tree data structure, comprising a root node, a number of intermediary nodes, and a number of leaf nodes. Each node may represent a layer, and each layer may include one or more GUI components. Certain GUI components may include interactive features and/or animations.

Particular embodiments maintain a canonical version of this GUI hierarchy in memory for the main thread for application execution, while making copies of the GUI hierarchy for use by other threads: one stored in memory for an input thread for use in processing data received from input devices, and one stored in memory for a graphics thread for use in rendering the GUI to a display device. By outsourcing input-processing tasks to a separate input thread and outsourcing display-output tasks to a separate graphics thread, such tasks may be handled asynchronously, thereby speeding up processing of input data, rendering of the GUI, and overall execution time for the application.

FIG. 1A illustrates an example GUI for a newsfeed comprised of a variety of components, some of which may include interactive features and/or animations. GUI 100, as displayed on a mobile device with a touchscreen includes several different static components, including status bar 102, content display region 104, and menu bar 106—in normal use (e.g., when the orientation of the device remains static), the position and/or dimensions of these regions may be fixed. Status bar 102 may display general status information, including the time (the format may be user-configurable), power status (e.g., whether the device is being charged or running on battery power, and how much battery capacity remains), and network information (identification of any network to which the mobile device is connected, as well as the strength of the network signal). Menu bar 106 may display a number of different menu buttons corresponding to different tabs, including "News Feed" button 106A, "People" button 106B, "Messenger" button 106C, "Notifications" button 106D, and "More" button 106E. The interactive regions for each of these buttons is shown by the dashed line. Within the dashed line for a particular button, a tap gesture may be detected and applied as user input indicating that the particular tab has been selected. Within the region covered by menu bar 106, a horizontal swipe gesture may be detected and applied as user input indicating that the user wishes to jump to a different tab.

Content display region 104 may detect and apply vertically-scrolling user input to reveal additional entries in the list of news feed items 110. In the view shown in FIG. 1A, region 104 includes three GUI components: header 107 (comprising search box 108, which may be tapped in order to begin receiving character input, and publisher bar 109, which may include interactive menu buttons 109A-C to allow the user to tap to post a "Status" message, upload a "Photo," or "Check-in" to a location) and news feed items 110A and 110B. Each news feed item 110 itself includes a number of GUI components: a header section 120, a posted-content section 130, and an interaction section 140. As shown with respect to news feed item 110A, header section 120A may include various GUI components, such as personal information associated with a poster of news feed item 110A and information related to news feed item 110A itself. Posted-content section 130A includes an interactive animated strip of images that may detect and apply horizontally-scrolling user input to display additional images uploaded to news feed item 110A. Interaction section 140A includes status information about user interactions with news feed item 110A as well as several interactive button regions (as shown by the dashed lines).

In particular embodiments, a strip of images in a posted-content section 130 (e.g., 130A or 130B) may be animated, such that by default, a number of images associated with the corresponding newsfeed item 110 (more than can be displayed in the strip at once) slowly scroll from the right side of the screen to the left side of the screen (as indicated by the heavy dashed arrow in FIG. 1A). The animation for a strip of images may commence once the entire strip (with respect to the height of the strip) is within the displayable region of the GUI (e.g., either upon loading content display region 104, as is the case for posted-content section 130A), or once a gesture of a sufficient magnitude of vertical scroll to bring the entire strip within content display region 104 is detected (as is the case for posted-content section 130B as shown in FIG. 1N).

In particular embodiments, the animation engine may compute and track animation-state variables for an animated GUI component such as a strip of images may include, by way of example and not limitation: a default speed of scroll and whether user input temporarily accelerating the speed of scroll has been received (e.g., by recognizing a horizontal swipe gesture in the region of the strip of images, calculating velocity/acceleration/duration of the gesture, and determining a corresponding magnitude and duration for the temporary acceleration). In particular embodiments, the main thread may initialize such animation-state variables and store them as part of the GUI hierarchy in association with the node representing the animated GUI component (e.g., as additional attributes associated with the node representing the animated GUI component, or in an attribute node connected by an edge to the node representing the animated GUI component). When the GUI hierarchy (including the animation-state variables) is subsequently copied from memory allocated for the input thread to memory allocated for the graphics thread, the graphics thread thereby receives instructions regarding how to render the frames in accordance with the animations. In alternate embodiments, the input thread may add such animation-related node attributes or attribute nodes to the GUI hierarchy as user input triggering an animation is received; in such cases, the updated GUI hierarchy may then be copied from memory allocated for the input thread to memory allocated for the main thread.

Figure 1B:
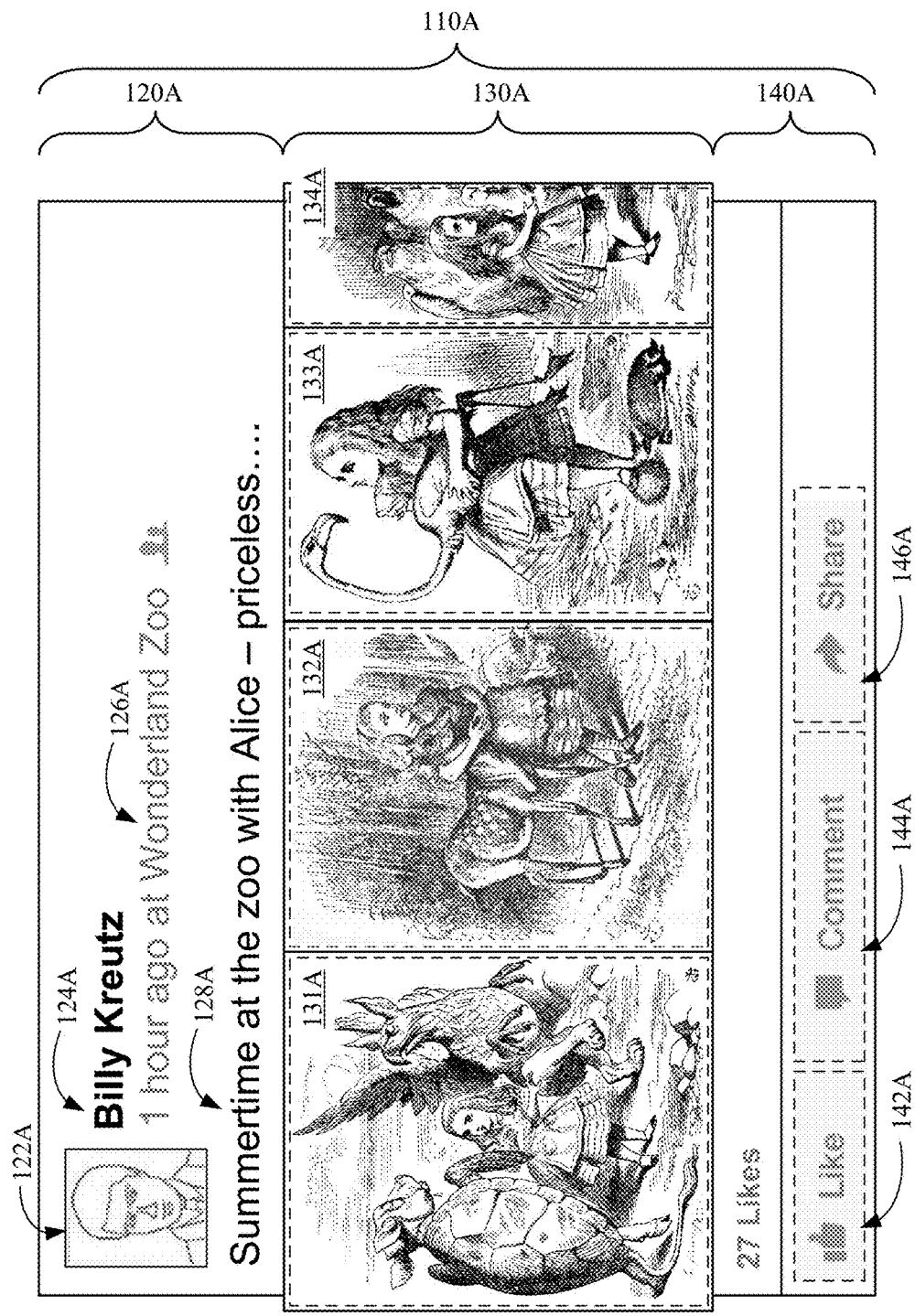
FIG. 1B illustrates a detailed view of a newsfeed item of the example GUI of FIG. 1A.

FIG. 1B illustrates a detailed view of news feed item 110A in the example GUI of FIG. 1A. As shown, header section 120A may include various GUI components, such as a photo 122A associated with a poster of news feed item 110A, a name 124A of the poster, timestamp and location information 126A related to news feed item 110A, and a caption 128A submitted by the poster for news feed item 110A. Each image (e.g., 131A-135A) in the animated strip of images in posted-content section 130A may itself be an interactive GUI component for which a tap gesture may be applied to zoom in on the individual image. The interactive region for each of the buttons 142A, 144A, and 146A in interaction section 140A is shown by a dashed line; within the dashed line, a tap gesture may be detected and applied as user input indicating that the button has been selected.

Figure 1C:
FIG. 1C illustrates an updated view of the example GUI of FIG. 1A showing animation of a strip of images in the newsfeed item.

FIG. 1C illustrates an updated view starting from the example GUI of FIG. 1A by showing an updated state of the animation for the strip of images in posted-content section 130A. As shown in FIG. 1C, the animation has advanced the strip to display images 133A-135A. In particular embodiments, the animation for the strip of images may have interactive features. For example, a horizontal swipe gesture (to the left or to the right, substantially within or starting within the region occupied by the strip of images) may temporarily accelerate the rate of scroll of images in the strip of images (wherein the duration and/or magnitude of acceleration may correspond to: the detected velocity or acceleration of the swipe gesture, the detected pressure in association with the swipe gesture, and/or the detected number of fingers involved in the swipe gesture). After the duration of acceleration has concluded, the rate of scroll may then decelerate and resume scrolling at the default scrolling rate. Other gestures may trigger other animations—for example, a pinch-zoom-out gesture on a strip of images that triggers an animation of the strip expanding into a grid of images (such that more of the images associated with the corresponding newsfeed item 110 can be viewed simultaneously). In another example, a "tap" gesture—a relatively quick gesture that is substantially shorter than the duration of a long press gesture (e.g., as shown over image 134A by the two concentric circles with broken lines)—on a particular photo in the strip of images may trigger an animation of the particular photo slowly growing (e.g., zooming in) to fill the screen in at least one dimension.

The gesture manager may receive data generated by the touchscreen sensing the tap gesture, wherein the data comprises coordinates detected at one or more particular times. The gesture manager may then determine the input type as a tap gesture and compute the location of the tap gesture with respect to the current GUI layout. After the location has been computed, the gesture manager may traverse the copy of the GUI hierarchy stored in memory for the gesture manager, in order to identify which layers are (1) registered to receive tap gestures and (2) include the location of the tap gesture within their perimeters. In this example, the location of the tap gesture was within the perimeter of the layer for image 134A, and therefore also within the perimeter of the layer for posted-content section 130A, the layer for news feed item 110A, the layer for content display region 104, and the top-level layer for GUI 100; however (as later described with respect to FIG. 2), only the layer for image 134A is registered to receive tap gestures, and so the tap gesture user input is applied to the layer for image 134A. Once the gesture manager determines the parameters and type of received user input, as well as identifying the layer(s) that should receive the user input, the gesture manager may then pass information about the gesture to the main thread and to the graphics thread at the same time.

In particular embodiments, since the user input triggered a zoom animation for image 134A, at this point, the main thread may initialize the animation-state variables for the zoom animation and store them as part of the updated GUI hierarchy in association with the node representing the animated GUI component; in particular embodiments, such tasks may be handled by the animation engine. In particular embodiments, the final zoomed-in version of image 134A may be represented by an additional node in the GUI hierarchy (e.g., node 134A in FIG. 2).

The main thread may perform other business logic-related tasks, such as, downloading a higher-resolution version of image 134A prior to zooming in, assessing how much battery power is remaining and the type of network to which the mobile device is connected (in order to ensure whether the device can afford to download the higher-resolution image), recording the fact that the user zoomed in on image 134A, and retrieving additional metadata and/or interactive features related to image 134A.

Since the graphics thread has already received the user input from the input thread, it need not wait for the main thread and may begin to asynchronously and immediately refresh the display output to display frames of an animation zooming in on image 134A. Once the main thread provides the updated copy of the GUI hierarchy for use by the graphics thread, the graphics thread may update the zoomed-in version of image 134A with information added by the main thread (e.g., by adding additional GUI components, such as tags and comments on image 134A, and/or interactive features related to the zoomed-in version of image 134A).

Figure 1D:
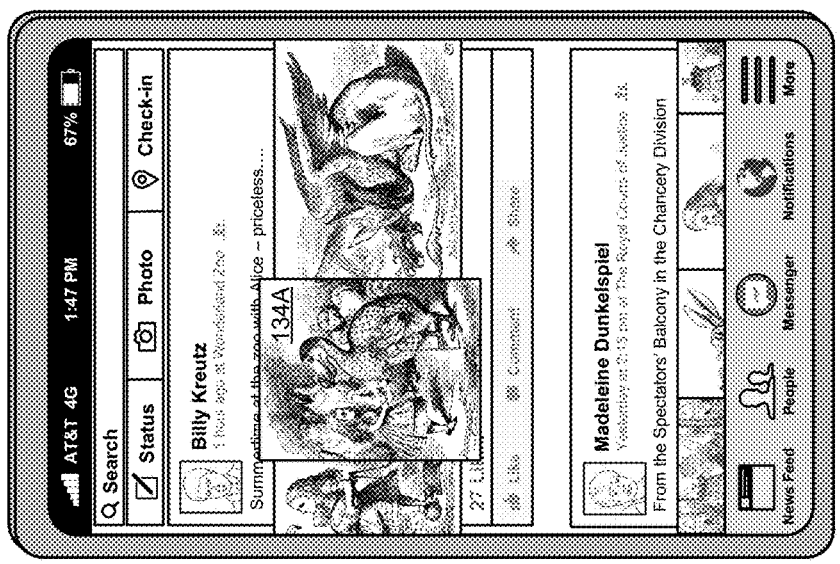
FIGS. 1D-F illustrate updated views of the example GUI of FIG. 1C after receiving user input.
Figure 1E:
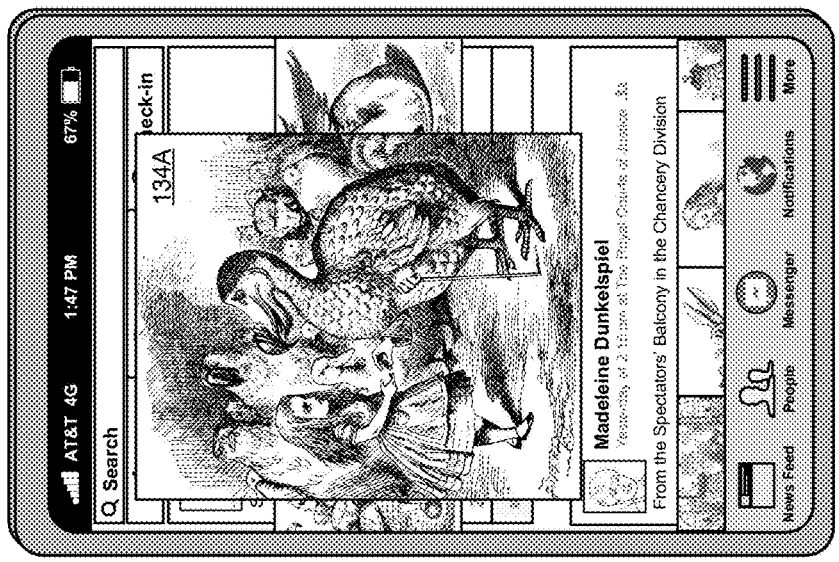
Figure 1F:
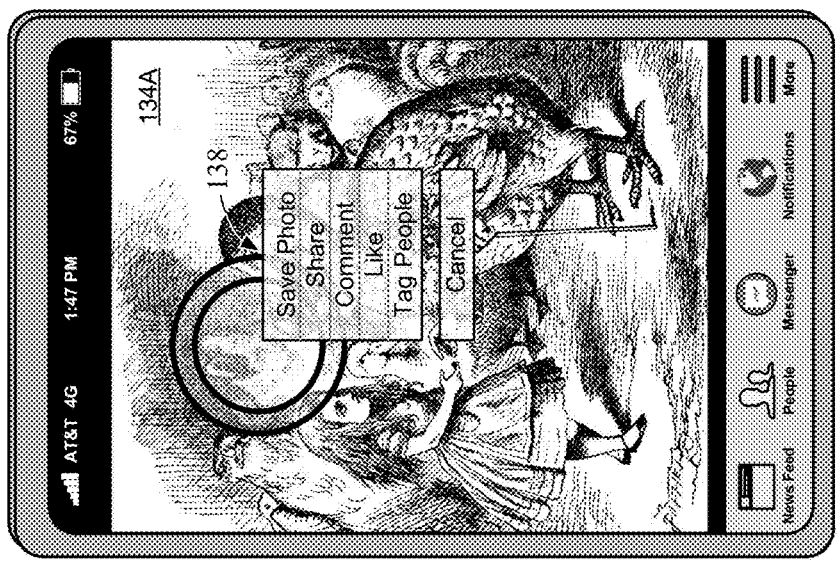

FIGS. 1D-F illustrate an animation of image 134A zooming in to fill content display region 104. FIG. 1F further illustrates an updated view of the zoomed-in image 134A after receiving user input to display a menu of options. The animation engine may compute and update the animation-state variables for the zoom animation for the image such as, by way of example and not limitation: a default speed of zoom and/or a final size for the zoomed-in image (e.g., based on a zoom mode, such as intermediate letterbox or full-screen). As shown in FIG. 1F, the zoomed-in version of image 134A may provide additional interactive features. For example, detection of user input identified as a "long hold" gesture—where the user presses a finger to the touchscreen and holds the finger in contact with the screen for at least 2 seconds (e.g., as shown over image 134A by the two concentric circles with solid lines)—over the zoomed-in image may trigger an animation of pop-up menu 138 appearing.

The gesture manager may determine the gesture parameters and identify the type of received user input as a long hold gesture, as well as identifying the layer(s) that should receive the user input. Since the user input triggered a pop-up menu animation for image 134A, at this point, corresponding animation-state variables (e.g., which pop-up menu to display, how quickly to animate appearance of the pop-up menu, where the pop-up menu should be positioned during the animation, whether to enlarge the pop-up menu) may be initialized, stored in the GUI hierarchy, and updated.

Figures 1J, 1K, 1L:
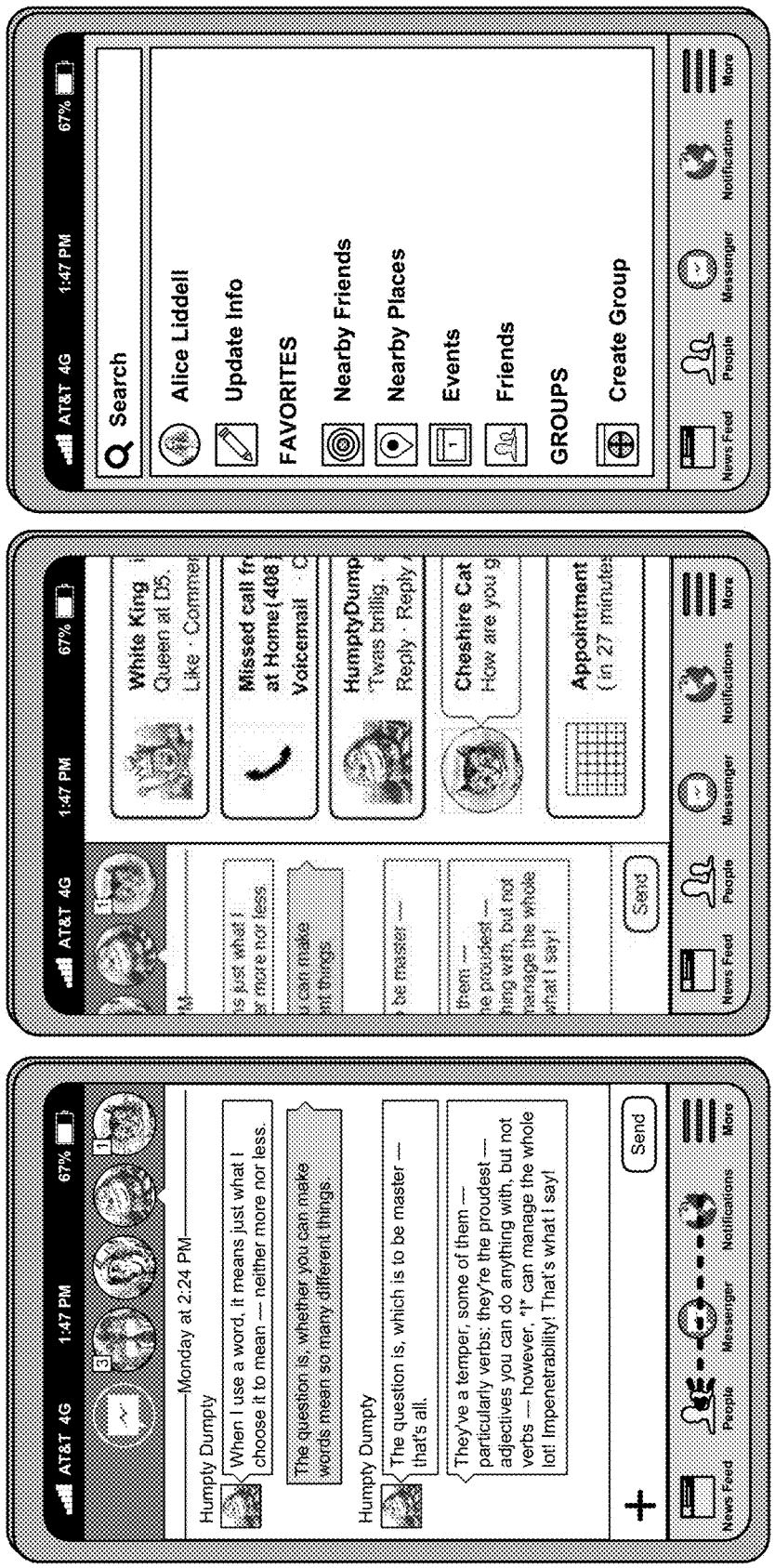

FIGS. 1G-L illustrate updated views of the example GUI of FIG. 1A after receiving user input to scroll horizontally through tabs 106A-106E. Each series (FIGS. 1G-1I and FIGS. 1J-1L) represents an animation that plays upon detecting a swipe gesture across the tabs in menu bar 106 (as shown in each of FIGS. 1G and 1J). As shown in each of FIGS. 1H and 1K, the animation displays a transition from a starting-point tab (the "News Feed" tab in FIG. 1G and the "Messenger" tab in FIG. 1J, respectively) to the subsequent tab (the "People" tab in FIG. 1H and the "Notifications" tab in FIG. 1K). Further transitions may be displayed by the animations until reaching the stopping-point tab (the "Messenger" tab, as shown in FIG. 1I, and the "More" tab, as shown in FIG. 1L). The animation engine may compute and update the animation-state variables for the zoom animation such as, by way of example and not limitation: a default speed of zoom, the number of tabs, the current tab to display (computed based on the number of tabs and the magnitude of the swipe). In the example shown in FIGS. 1G and 1J, a horizontal swipe gesture is detected substantially over menu bar 106, and the horizontal distance traveled by the swipe gesture is computed as being around 40% of the horizontal width of menu bar 106. Since the user input triggered a tab transition animation displayed in content display region 104, at this point, corresponding animation-state variables (e.g., which tab to display, how many total tabs exist, how quickly to animate scrolling through the tabs) may be initialized, computed or updated, and stored in the GUI hierarchy (with respect to content display region 104). For both swipe gestures, the target tab may be computed as being the tab positioned at a distance from the current tab that is equivalent to 40% of the overall horizontal width of menu bar 106 (for FIG. 1G, the current tab is the "News Feed" tab, and the target tab two tabs down menu bar 106 is computed as being the "Messenger" tab; for FIG. 1J, the current tab is the "Messenger" tab, and the target tab is computed as being the "More" tab). This horizontal scrolling animation between tabs 106A-106E may be displayed in content display region 104 as a sliding motion of the GUI layout as shown in images 1G-1L. In particular embodiments, if the user opens and/or closes a tab, the animation-state variables for content display region 104 may be updated to reflect the change in the total number of tabs.

Figure 1M:
FIG. 1M illustrates an updated view of the example GUI of FIG. 1A after receiving user input to scroll vertically down through the newsfeed.
Figure 1N:
FIG. 1N illustrates an updated view of the example GUI of FIG. 1A that displays a header bar after receiving user input to scroll vertically back up through the newsfeed.

FIG. 1M illustrates an updated view starting from the example GUI of FIG. 1A. After detecting an "upward" vertical-scrolling gesture (e.g., a swipe gesture detected as beginning at a location within content display region 104 and moving upwards, which may be interpreted as user input instructing GUI 100 to scroll further down the news feed) generally over a portion of content display region 104, the application may apply the vertical-scrolling gesture user input and move the newsfeed content displayed in content display region 104 upwards in order to display additional news feed items (i.e., news feed item 110B).

Based on the data received from the input devices, the gesture manager may determine the input type as a vertical-scrolling gesture (by computing the path of the gesture based on multiple pairs of coordinates), compute the location of the gesture with respect to the current GUI layout, and identify the layer for content display region 104 to receive the user input. In this case, the only layer registered to receive an input type of a vertical-scrolling gesture is content display region 104, so once we know what general type of gesture was detected and where it occurred with respect to the current GUI layout, it is a simple matter to determine that the gesture should be applied to the layer for content display region 104.

As part of applying the vertical-scrolling gesture to content display region 104, the animation engine may determine that the gesture triggered an animation for header bar 107, which causes the header bar 107 to slide upwards and disappear in order to provide an increased area of content display region 104 in which news feed content may be displayed (while the user is scrolling "downward" and looking through the news feed). The animation engine may compute and update the animation-state variables for the animation of header bar 107 such as, by way of example and not limitation: a default speed of appearance/disappearance.

FIG. 1N illustrates an updated view starting from the example GUI of FIG. 1E. In FIG. 1E, content display region 104 has been scrolled up so as to display news feed item 110C, for which posted-content section 130C includes a video 132C and a scrollable text area 134C including a synopsis of the content captured in video 132C. The layer for video 132C is registered to receive tap gestures in order to control video playback, and the layer for scrollable text area 134C is registered to receive vertical-scrolling gestures. The height of scrollable text area 134C, however, if the mobile device is the size of a typical APPLE IPHONE, then it may be very likely that most users will exceed the perimeter of scrollable text area 134C when attempting a vertical-scrolling gesture to read through the text. The situation may become more complicated for the input thread to determine the intended gesture since the layer for content display region 104 (which is a parent node of the layer for scrollable text area 134C in the GUI hierarchy) is also registered to receive vertical-scrolling gestures.

Based on the data received from the input devices, the gesture manager may determine the input type as a "downward" vertical-scrolling gesture, compute the location of the gesture with respect to the current GUI layout, and identify the layer for content display region 104 to receive the user input. As part of applying the vertical-scrolling gesture to content display region 104, the animation engine may determine that the gesture triggered an animation for header bar 107, which causes the header bar 107 to slide downwards and appear in order to provide the user with an opportunity to either search through the news feed or to post their own content.

In particular embodiments, when the input thread identifies the input type as a scrolling-type gesture and computes the path of the gesture as passing through and extending beyond the perimeter of one layer that is registered to receive the identified input type into another layer that is registered to receive the identified input type, the input thread may identify the user input as two gestures: a first gesture to be applied to a first layer, based on the portion of the path that took place within the perimeter of the first layer, and a second gesture to be applied to a second layer, based on the portion of the path that took place within the perimeter of the second layer. For example, in the GUI layout illustrated in FIG. 1F, if the path of the gesture began at the bottom of scrollable text area 134C, moved upwards, and continued into the middle of video 132C, the input thread may determine two vertical-scrolling gestures: the first gesture applying to the layer for scrollable text area 134C to scroll up the text content in that GUI component and reveal more of the synopsis, and the second gesture applying to the layer for content display region 104 to scroll up content display region 104 and reveal the next news feed item after 110C.

In particular embodiments, when the input thread identifies the input type as a scrolling-type gesture and computes the path of the gesture as passing through and extending beyond the perimeter of one layer that is registered to receive the identified input type into another layer that is registered to receive the identified input type, the input thread may apply a gesture to only one of the layers—the layer within whose perimeter the starting point of the path was detected.

Figure 2:
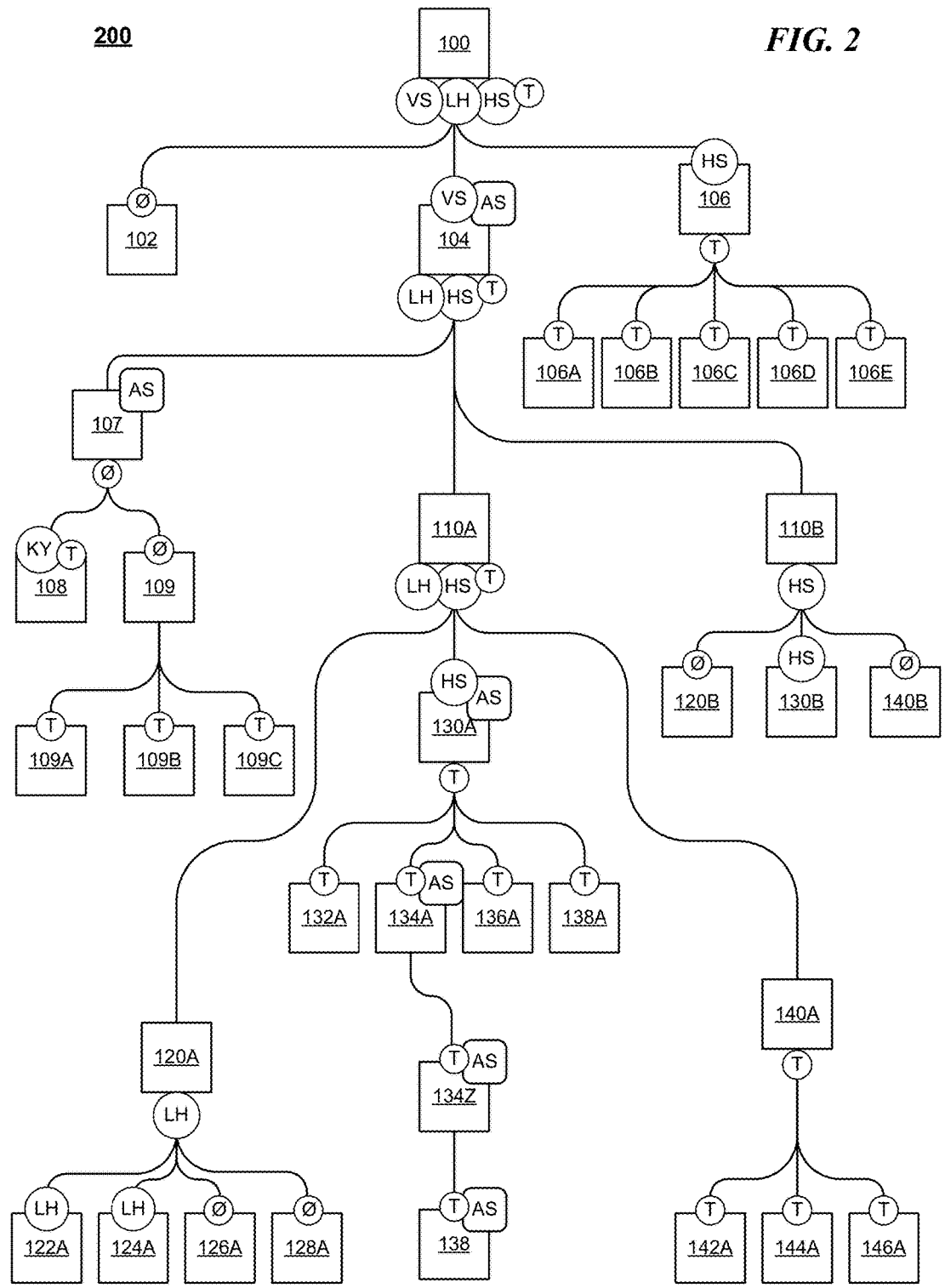
FIG. 2 illustrates a GUI hierarchy based on the example GUI of FIG. 1A.

FIG. 2 illustrates a GUI hierarchy 200, which is a hierarchical organization of layers. GUI hierarchy 200 is represented as a tree data structure, comprising root node 100 (representing GUI 100), a number of intermediary nodes (e.g., node 104, representing content display region 104), and leaf nodes (e.g., node 106E, representing the "More" button 106E. Each layer represents a logical grouping of components of GUI 100 based on the example illustrated in FIG. 1A. Components of GUI 100 may be logically grouped on the basis of spatial positioning in the layout. For example, since header 107, news feed item 110A and news feed item 110B each appear within the perimeter of content display region 104, nodes 108, 110A, and 110B are represented by nodes in the GUI hierarchy that appear in the sub-tree originating at node 104. In particular embodiments, any component of GUI 100 that is referenced by and/or incorporated into a document (e.g., a HTML or XML document) may be represented by a node in GUI hierarchy 200 even though they are not visually represented in GUI 100. For example, a HTML document for GUI 100 may include a client-side script component associated with "More" button 106E that will display a pop-up menu of additional menu items if the user's finger performs a long hold gesture over the button—this pop-up menu component may be represented by a node in GUI hierarchy 200.

Each node of GUI hierarchy 200 may include attributes with layout information about a layer represented by the node, such as a set of coordinate pairs defining a perimeter for the layer, indications of one or more types of user input that may be applied to the layer (e.g., horizontal swipe gestures for menu bar 106, vertical swipe gestures for content display region 104, horizontal swipe gestures for scrolling image strip 130, tap gestures for image 134A, and long hold gestures for image 134Z), indications of one or more animations that may be applied to the layer (e.g., as shown for scrolling content display region 104, appearing/disappearing header 107, scrolling image strip 130, zooming image 134A, and pop-up menu 138), and a current position of the layer (e.g., a set of coordinates at which to position an anchor point for the layer, such as the upper-left-hand corner of a news feed item 110).

As shown in FIG. 2, each node representing a layer in the example GUI 100 shown in FIG. 1A is marked with attribute circles indicating one or more types of user input that may be applied to the layer. An attribute circle positioned at the top edge of a node indicates that the input type indicated by the attribute circle may be applied to the layer represented by that node. For example, node 104 represents content display region 104, which may be vertically scrolled, so node 104 is marked with an attribute circle "VS" positioned at the top edge of the node. In another example, node 106 represents menu bar 106, which may be horizontally scrolled, so node 106 is marked with an attribute circle "HS" positioned at the top edge of the node. An attribute circle positioned along the bottom edge of a node indicates that the input type indicated by the attribute circle may be applied to a layer in the sub-tree of GUI hierarchy 200 originating with that node. For example, node 106 represents menu bar 106—the sub-tree of GUI hierarchy originating with node 106 includes node 106C representing the "Messenger" button, which may be tapped, so node 106 is marked with an attribute circle "T" positioned along the bottom edge of the node. Of the layers represented by nodes in GUI hierarchy 200, the input types shown include: "VS" (vertical scrolling), "HS" (horizontal scrolling), "T" (tapping), "LH" (long hold), and "KY" (keyboard input). Certain layers do not include any interactive features, such as node 102; such nodes are marked with an attribute circle displaying the null symbol: Ø.

In particular embodiments, node attributes may include additional information about the layer represented by the node, such as a content ID for a content item being displayed by a GUI component of the layer, a content type for the content item, a timestamp for the content item, a record of whether the user has interacted with the content item (and, if so, in what manner), social-graph information and/or social-networking information associated with the content item with respect to the user of the mobile device, etc.

As noted earlier, in particular embodiments, the animation-state variables and store them as part of the GUI hierarchy in association with the node representing the animated GUI component (e.g., as additional attributes associated with the node representing the animated GUI component, or in an attribute node connected by an edge to the node representing the animated GUI component). In the GUI hierarchy as shown in FIG. 2, the animation-state variables are denoted with an "AS" (for "animation state"). When the GUI hierarchy (including the animation-state variables) is subsequently copied from memory allocated for the input thread to memory allocated for the graphics thread, the graphics thread thereby receives instructions regarding how to render the frames in accordance with the animations. In alternate embodiments, the input thread may add such animation-related node attributes or attribute nodes to the GUI hierarchy as user input triggering an animation is received; in such cases, the updated GUI hierarchy may then be copied from memory allocated for the input thread to memory allocated for the main thread. Some examples of information that may be tracked by using animation-state variables include: scale (x, y, and z), opacity, rotation (x, y, and z), skew (x and y), anchor point, perspective, width/height, effect (blur, color transformation: de-/saturation, greyscale, color rotation), and 3D transformations).

Figure 3:
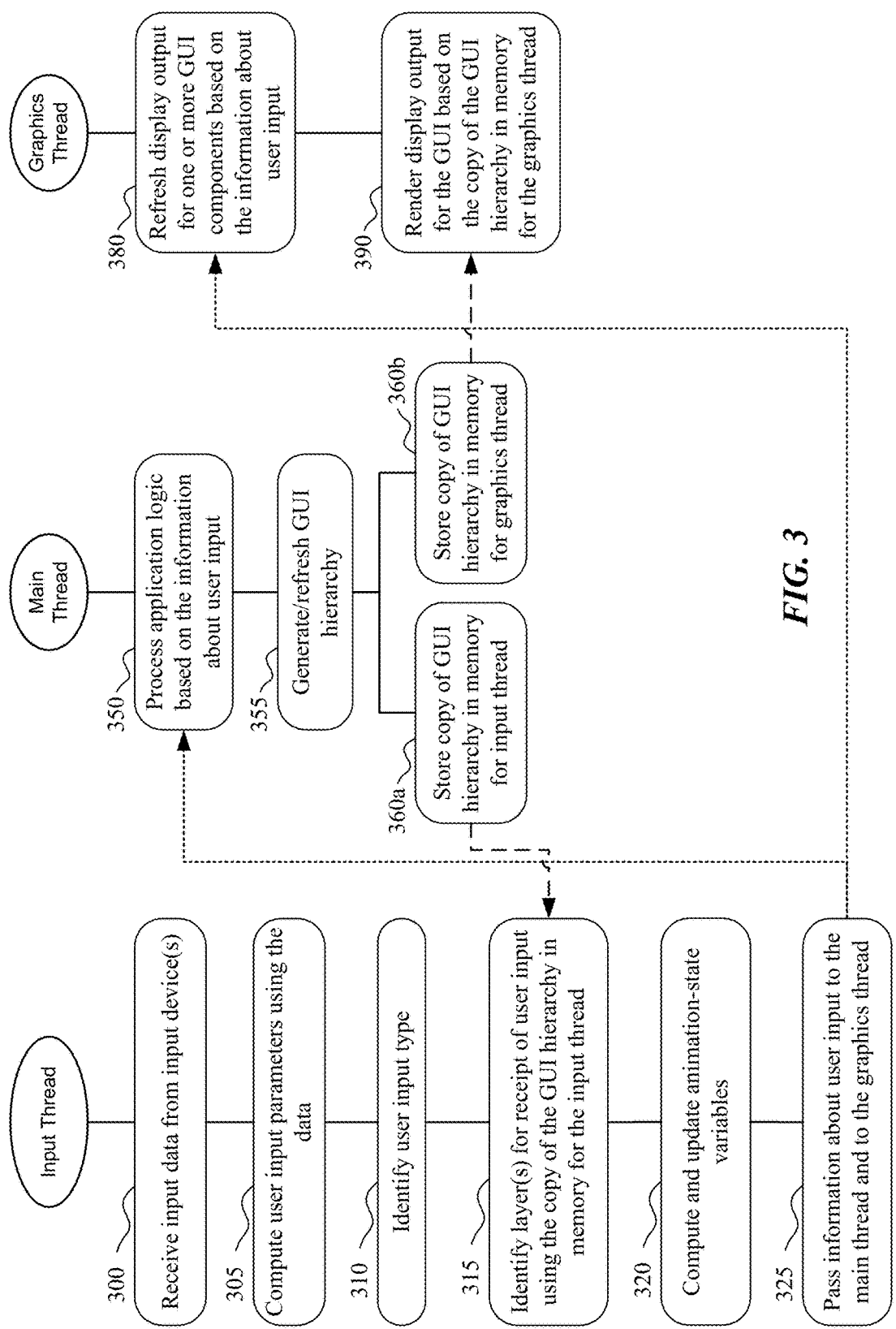
FIG. 3 illustrates an example method for asynchronous execution of instructions.

FIG. 3 illustrates an example method for asynchronous execution of instructions for one application by multiple threads. As illustrated in FIG. 3, steps of the method are performed by three different threads executing on a computing device: the Input Thread, the Main Thread, and the Graphics Thread. Steps of the method are described herein presume that the application has already been launched, is executing in the foreground, that the Main Thread has already (1) generated at least an initial GUI hierarchy and (2) stored copies of the GUI hierarchy in memory for the input thread and in memory for the graphics thread. And as described above, in the examples described herein, the gesture manager handles execution of all of its tasks using the Input Thread.

The method may begin at step 300, where the gesture manager receives input data from one or more input devices, such as a touchscreen. The input data may include one or more pairs of coordinates where touch input was sensed, a start time, and an end time.

At step 305, the gesture manager computes user input parameters using the received data. The parameters may include a duration of time associated with the user input based on the received data. The parameters may include a location for the user input, wherein the location may be a single location associated with a pair of coordinates or a path associated with multiple pairs of coordinates. In the case of a scrolling gesture, the parameters may include an axis of scrolling (e.g., vertical or horizontal), a direction (e.g., up, down, left, right), a scrolled distance (computed with respect to the axis of scrolling), and (possibly with respect to portions of the path) velocity and/or acceleration/deceleration. In particular embodiments, techniques described in U.S. patent application Ser. No. 13/689,598, titled "Using Clamping to Modify Scrolling" and filed 29 Nov. 2012, may be applied to enhance methods described herein by clarifying vague scrolling-type gestures (e.g., to assess and apply an axis of scrolling, a direction of scrolling, and compute the scrolled distance when the user's finger does not move in a perfectly straight line and/or does not move in a direction perfectly orthogonal to a particular axis of scrolling).

At step 310, the gesture manager identifies a type of the user input based on the location and the duration of time associated with the user input. If the location is a single location and the duration is short, the gesture manager may identify the type of the user input as a tap gesture. If the location is a single location and the duration is long, the Input Thread may identify the type of the user input as a long hold gesture. If the location is a path, the gesture manager may identify the type of the user input as a scrolling-type gesture (which may be vertical, horizontal, etc.). In particular embodiments, if the location is an extremely short path, the Input Thread may treat the location as a single location, rather than a path.

At step 315, the gesture manager identifies one or more layers of the GUI hierarchy for receipt of the user input. Each layer of the GUI hierarchy may be associated with a set of coordinate pairs defining a perimeter for the layer. In addition, each layer of the GUI hierarchy may be associated with one or more types of user input (as shown in FIG. 2). The gesture manager may traverse its copy of the GUI hierarchy, wherein at each layer, the gesture manager makes a determination based on (1) whether the location for the user input is substantially within the perimeter for the current layer, and (2) whether the identified type for the user input matches one of the types of user input associated with the current layer. If both conditions are true, and if the current layer is a leaf node in the GUI hierarchy, the gesture manager identifies the current layer for application of user input. If both conditions are true, and if the current layer is not a leaf node, the gesture manager determines whether any child nodes of the current layer are registered to receive user input of the type identified in step 310—if not, then the gesture manager identifies the current layer for application of user input; otherwise the gesture manager continues to traverse the GUI hierarchy. In particular embodiments, as the gesture manager traverses the GUI hierarchy, a temporary copy of the GUI hierarchy may be generated that includes only those nodes having some relation to the identified layers.

At step 320, the Input Thread may compute and update animation-state variables in accordance with a type of animation specified for a particular GUI component. In some cases, the Input Thread may simply compute and update animation-state variables for an existing animation in accordance with the specified type of animation; in some cases, the Input Thread may also take into account user input triggering or modifying the animation.

In particular embodiments, specification of the animation may be accomplished by way of a simple programming language that specifies different types of behavior for different types of animation. For the animation illustrated in FIGS. 1G-L (when the user scrolls horizontally through tabs 106A-106E), example programming code specifying the animation is shown below:
    indicator.x=pager.x/number_of_pages;
where pager.x is a variable representing the x (or horizontal scroll) position of the pager layer, and number_of_pages is a variable (representing the number of tabs). In particular embodiments, the variable number_of_pages may be set by the main thread when it creates the layer tree.

For the animation illustrated in FIGS. 1D-F (when the user zooms in on image 134A), example programming code specifying the animation is shown below for an embodiment where the main thread handles execution of tasks to respond to user input:

```
var target;
let f = spring(k = 0.5, rest_point = target);
image.x = lerp(f, zoomed_x, resting_x);
image.y = lerp(f, zoomed_x, resting_y);
image.scale = lerp(f, zoomed_x, resting_scale);
```

In this example, variable f is configured with a particular constant k as referenced by Hooke's law. The target variable (representing the natural resting spot of the spring) may be updated by the main thread in response to receiving an indication that a longpress gesture input was received. The value of variable f may then be used to do a linear interpolation between the two pre-computed layouts (x, y, scale) for the image in its resting and zoomed states:

In an alternate embodiment, where the input thread handles execution of tasks to respond to user input, example programming code specifying the animation is shown below for the animation illustrated in FIGS. 1D-F:

```
let gesture = longpress(phase = bubble, duration = 300ms);
let target = if gesture.state == STARTED then 0 else 1;
let f = spring(k = 0.5, rest_point = target);
image.x = lerp(f, zoomed_x, resting_x);
image.y = lerp(f, zoomed_x, resting_y);
image.scale = lerp(f, zoomed_x, resting_scale);
```

In this example, the longpress gesture input (parameterized by gesture dispatch phase and duration) triggers the animation and sets the target value for the spring either to 0 (e.g., fully zoomed-out state) if the gesture is active, or to 1 (e.g., resting state) if the longpress gesture has not been detected, or has not yet activated (e.g., a press gesture has just been detected but hasn't lasted long enough to qualify as a longpress gesture yet), or has been canceled (e.g., due to the press gesture terminating before qualifying as a longpress gesture, or due to receiving touch events from other fingers).

At step 325, the Input Thread passes, to the Main Thread and to the Graphics Thread, information about the user input. By passing information needed to update the GUI directly from the Input Thread to both the Graphics Thread and to the Main Thread, the Graphics Thread is able to proceed immediately (and asynchronously) with updating the GUI in response to the user input.

The information passed to the Graphics Thread and the Main Thread may comprise the computed user input parameters, the identified type of the user input, the duration of time associated with the user input, the layers of the GUI hierarchy identified for receipt of the user input, and/or any additional information about the user input. For example, in the case where a scrolling-type gesture was identified, the Input Thread may send information about the gesture to the Graphics Thread and the Main Thread at the same time, such that both of those threads are able to asynchronously proceed with processing the information about the user input. Therefore, while the Main Thread is processing a notification from the Input Thread that a scrolling-type gesture has been detected and determining whether to update the content displayed in existing layers and/or to generate content to fill in new layers, the Graphics Thread may concurrently translate the content displayed in the layer for content display region 104 (the scrollable region) by the computed scrolled distance and re-render the display output. In particular embodiments, the Input Thread may only send information to the Graphics Thread for particular types of user input resulting in simple/straightforward GUI updates (e.g., user input that triggers an animation or video playback or user input representing a command to move an object or highlight an image as being selected); in such embodiments, the Input Thread may send the information about the user input to only the Main Thread when the user input would result in a more complex GUI modification (e.g., generation of new content to fill in new layers).

At step 350, the Main Thread processes business logic for the application using the identified gesture. At step 355, the Main Thread generates and/or refreshes the GUI hierarchy, and in steps 360a and 360b, the Main Thread stores a copy of the GUI hierarchy in memory for the Input Thread and a copy of the GUI hierarchy in memory for the Graphics Thread, respectively. As noted earlier, in particular embodiments, the main thread may initialize such animation-state variables and store them as part of the GUI hierarchy in association with the node representing the animated GUI component (e.g., as additional attributes associated with the node representing the animated GUI component, or in an attribute node connected by an edge to the node representing the animated GUI component). When the GUI hierarchy (including the animation-state variables) is subsequently copied from memory allocated for the input thread to memory allocated for the graphics thread, the graphics thread thereby receives instructions regarding how to render the frames in accordance with the animations. In alternate embodiments, the input thread may add such animation-related node attributes or attribute nodes to the GUI hierarchy as user input triggering an animation is received; in such cases, the updated GUI hierarchy may then be copied from memory allocated for the input thread to memory allocated for the main thread.

At step 380, the Graphics Thread refreshes the display output either for the entire UI or for one or more components of the GUI, using the information received from the input thread. In step 390, once the Graphics Thread has received the updated copy of the GUI hierarchy from the Main Thread, the Graphics Thread may re-render and/or update the display output again.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
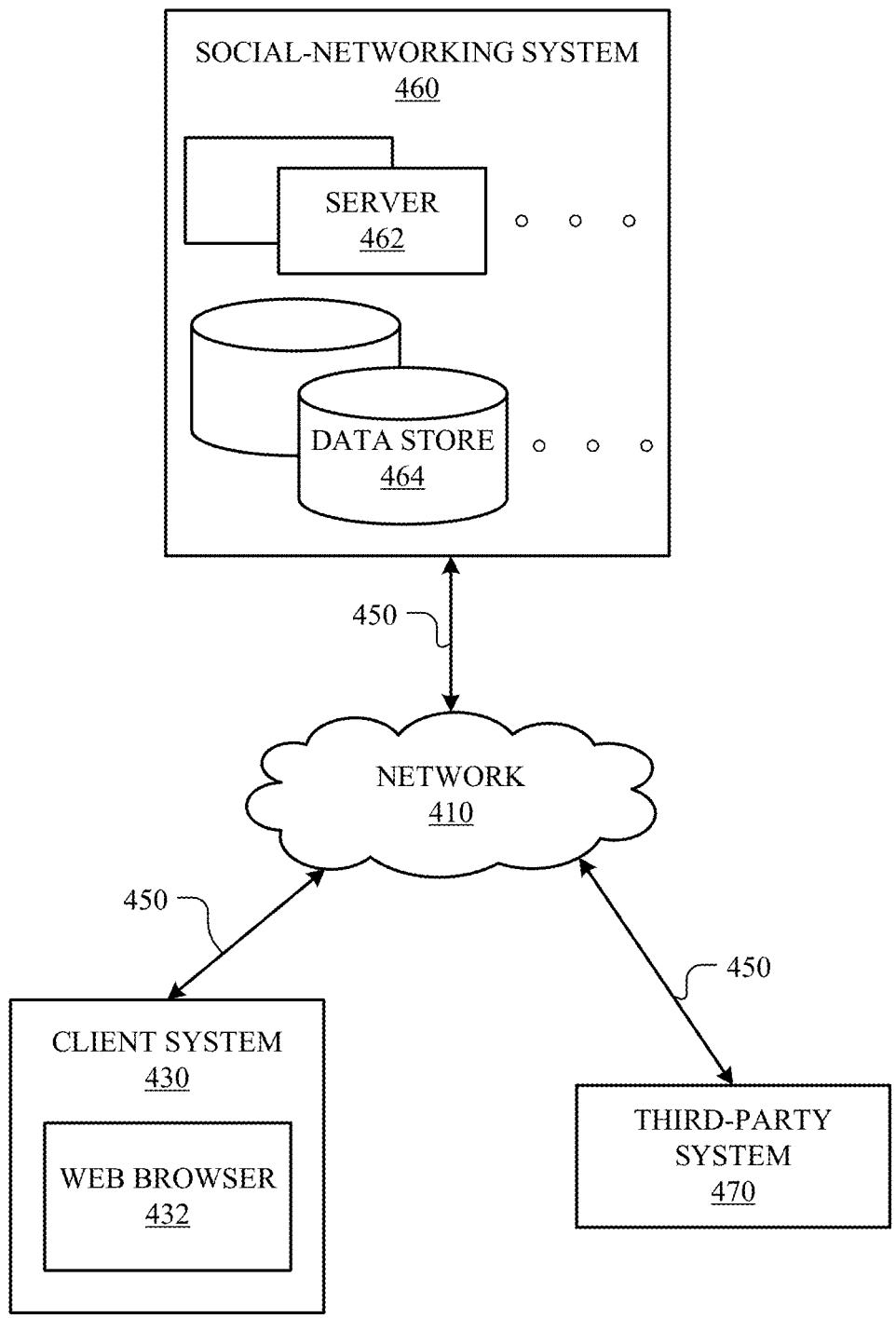
FIG. 4 illustrates an example network environment associated with a social-networking system.

FIG. 4 illustrates an example network environment 400 associated with a social-networking system. Network environment 400 includes a user 401, a client system 430, a social-networking system 460, and a third-party system 470 connected to each other by a network 410. Although FIG. 4 illustrates a particular arrangement of user 401, client system 430, social-networking system 460, third-party system 470, and network 410, this disclosure contemplates any suitable arrangement of user 401, client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of users 401, client systems 430, social-networking systems 460, third-party systems 470, and networks 410, this disclosure contemplates any suitable number of users 401, client systems 430, social-networking systems 460, third-party systems 470, and networks 410. As an example and not by way of limitation, network environment 400 may include multiple users 401, client system 430, social-networking systems 460, third-party systems 470, and networks 410.

In particular embodiments, user 401 may be an individual (human user), an entity (e.g., an enterprise, business, or third-party application), or a group (e.g., of individuals or entities) that interacts or communicates with or over social-networking system 460. In particular embodiments, social-networking system 460 may be a network-addressable computing system hosting an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 410. In particular embodiments, social-networking system 460 may include an authorization server (or other suitable component(s)) that allows users 401 to opt in to or opt out of having their actions logged by social-networking system 460 or shared with other systems (e.g., third-party systems 470), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. Third-party system 470 may be accessed by the other components of network environment 400 either directly or via network 410. In particular embodiments, one or more users 401 may use one or more client systems 430 to access, send data to, and receive data from social-networking system 460 or third-party system 470. Client system 430 may access social-networking system 460 or third-party system 470 directly, via network 410, or via a third-party system. As an example and not by way of limitation, client system 430 may access third-party system 470 via social-networking system 460. Client system 430 may be any suitable computing device, such as, for example, a personal computer, a laptop computer, a cellular telephone, a smartphone, or a tablet computer.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

Figure 5:
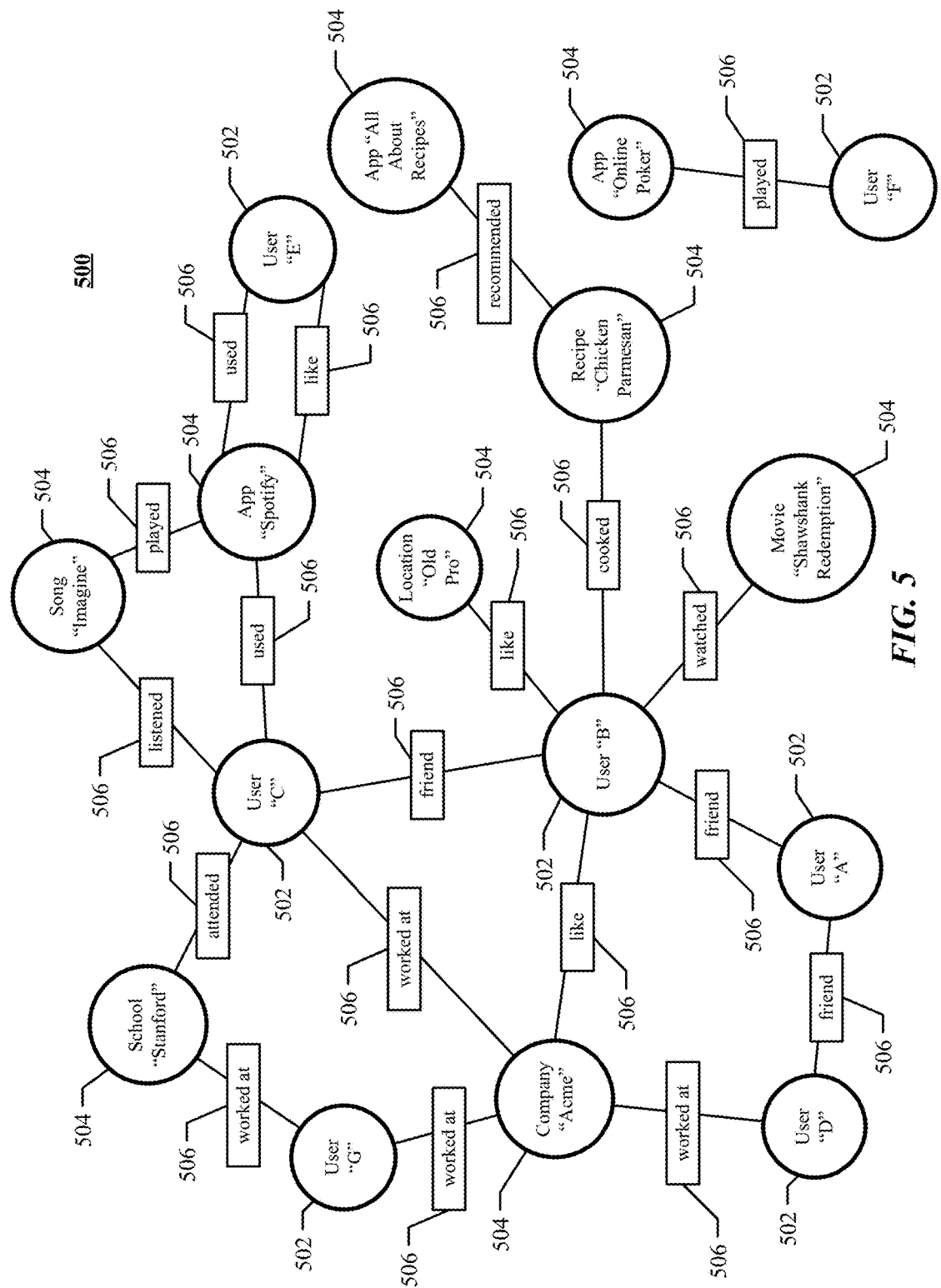
FIG. 5 illustrates an example social graph.

FIG. 5 illustrates example social graph 500. In particular embodiments, social-networking system 460 may store one or more social graphs 500 in one or more data stores. In particular embodiments, social graph 500 may include multiple nodes—which may include multiple user nodes 502 or multiple concept nodes 504—and multiple edges 506 connecting the nodes. Example social graph 500 illustrated in FIG. 5 is shown, for didactic purposes, in a two-dimensional visual map representation. In particular embodiments, a social-networking system 460, client system 430, or third-party system 470 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 460. As an example and not by way of limitation, a user may be an individual (human user), an entity (e.g., an enterprise, business, or third-party application), or a group (e.g., of individuals or entities) that interacts or communicates with or over social-networking system 460. In particular embodiments, when a user registers for an account with social-networking system 460, social-networking system 460 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 460. In particular embodiments, a user node 502 may be associated with information provided by a user or information gathered by various systems, including social-networking system 460. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 460 or a third-party website associated with a web-application server); an entity (such as, for example, a person, business, group, sports team, or celebrity); a resource (such as, for example, an audio file, video file, digital photo, text file, structured document, or application) which may be located within social-networking system 460 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 504 may be associated with information of a concept provided by a user or information gathered by various systems, including social-networking system 460. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 460. Profile pages may also be hosted on third-party websites associated with a third-party server 470. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 470. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 430 to send to social-networking system 460 a message indicating the user's action. In response to the message, social-networking system 460 may create an edge (e.g., an "eat" edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 460 may send a "friend request" to the second user. If the second user confirms the "friend request," social-networking system 460 may create an edge 506 connecting the first user's user node 502 to the second user's user node 502 in social graph 500 and store edge 506 as social-graph information in one or more of data stores 464. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to a edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 460 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 460 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 460 may create a "played" edge 506 (as illustrated in FIG. 5) between concept nodes 504 corresponding to the song and the application to indicate that the particular song was played by the particular application. In this case, "played" edge 506 corresponds to an action performed by an external application (SPOTIFY) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504 for "SPOTIFY").

In particular embodiments, social-networking system 460 may create an edge 506 between a user node 502 and a concept node 504 in social graph 500. As an example and not by way of limitation, a user viewing a concept-profile page (such as, for example, by using a web browser or a special-purpose application hosted by the user's client system 430) may indicate that he or she likes the concept represented by the concept node 504 by clicking or selecting a "Like" icon, which may cause the user's client system 430 to send to social-networking system 460 a message indicating the user's liking of the concept associated with the concept-profile page. In response to the message, social-networking system 460 may create an edge 506 between user node 502 associated with the user and concept node 504, as illustrated by "like" edge 506 between the user and concept node 504. In particular embodiments, social-networking system 460 may store an edge 506 in one or more data stores. In particular embodiments, an edge 506 may be automatically formed by social-networking system 460 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

Figure 6:
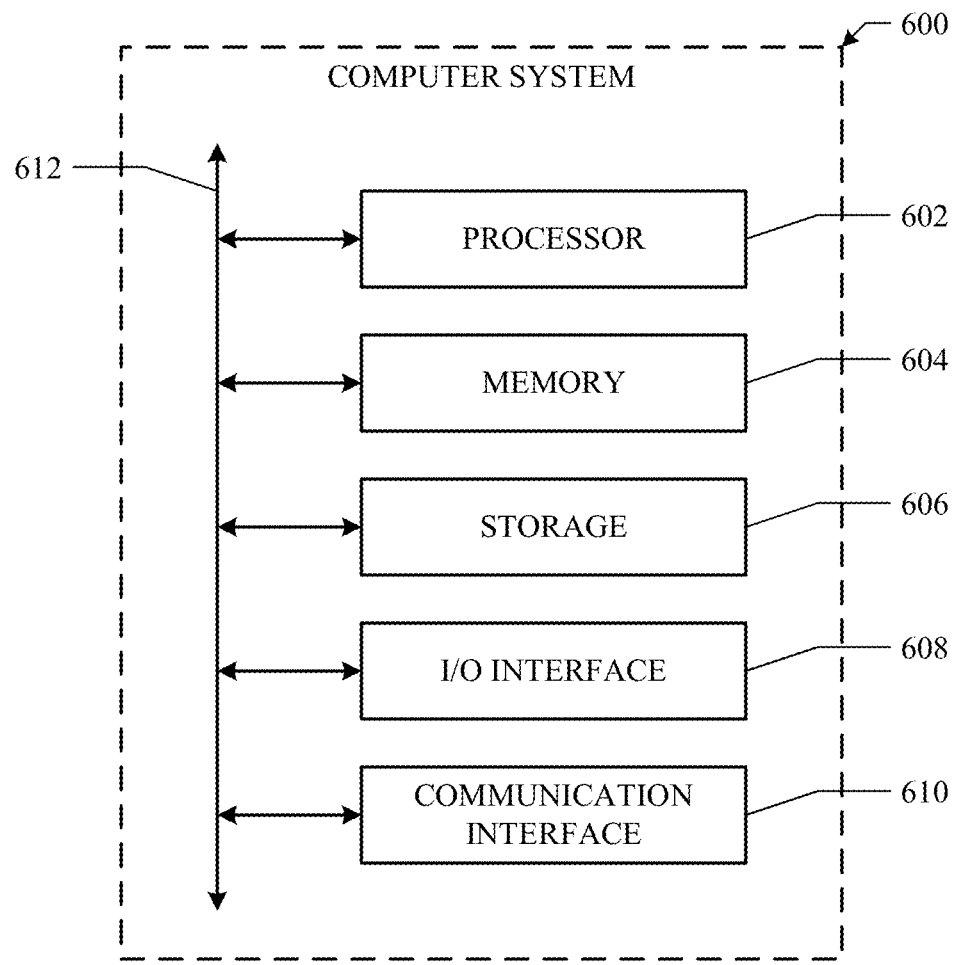
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, executing, by a main thread, instructions to:
   generate a hierarchy comprising a representation of a graphical user interface (GUI), wherein the GUI comprises an animated component; and
   provide copies of the hierarchy to an input thread and a graphics thread;
   by the computing device, asynchronously executing, by the input thread, instructions to:
   initialize state variables for the animated component based on a triggering condition for animation of the animated component; and
   provide information about the initialized state variables to the graphics thread; and
   by the computing device, asynchronously executing, by the graphics thread, instructions to update the GUI by rendering a first frame of the animation based on the state variables.

2. The method of claim 1, further comprising:
   asynchronously executing, by the input thread, instructions to:

update, based on a specified frame rate, the state variables; and provide information about the updated state variables to the graphics thread; and asynchronously executing, by the graphics thread, instructions to update, based on the specified frame rate, the GUI by rendering a second frame of the animation based on the updated state variables.

3. The method of claim 2, further comprising:

asynchronously executing, by the input thread, instructions to:

update the state variables;

determine that the animation is complete;

provide information about the updated state variables to the graphics thread; and asynchronously executing, by the graphics thread, instructions to update the GUI by rendering a final frame of the animation based on the updated state variables.

4. The method of claim 2, further comprising:

asynchronously executing, by the main thread, instructions to:

identify conditions for termination of the animated component; and provide information about the identified conditions to the input thread;

asynchronously executing, by the input thread, instructions to:

process the information about the conditions;

update the state variables based on the determined gesture; and provide information about the updated state variables to the graphics thread; and asynchronously executing, by the graphics thread, instructions to update the GUI by rendering a termination frame of the animation based on the updated state variables.

5. The method of claim 4, wherein the identified conditions comprise a power status of the computing device, a networking connectivity status of the computing device, a memory status of the computing device, a sensor status of the computing device, a configured preference of the user with respect to animated components, or a configured preference of the user with respect to GUI components having a particular attribute.

6. The method of claim 4, wherein the termination frame comprises a current frame of the animation, a final frame of the animation, an indication that the animation has stopped, an indication that the animation has paused, or a status message.

7. The method of claim 2, further comprising:

asynchronously executing, by the input thread, instructions to:

process user input to determine a gesture based on data received from input devices, wherein the data indicates user interactions with the animated component;

update the state variables based on the determined gesture;

provide information about the updated state variables to the graphics thread; and provide information about the determined gesture to the main thread; and asynchronously executing, by the graphics thread, instructions to update, based on the specified frame rate, the GUI by rendering a third frame of the animation based on the updated state variables.

8. The method of claim 1, further comprising:

asynchronously executing, by the input thread, instructions to determine the gesture by:

computing a location for the user input based on the received data, wherein the location is a single location associated with a pair of coordinates or a path associated with multiple pairs of coordinates;

computing a duration of time associated with the user input based on the received data; and identifying a type for the user input based on the location and the duration of time.

9. The method of claim 8, wherein the location for the user input indicates a static location and a long duration, wherein the identified type for the user input comprises a long hold gesture.

10. The method of claim 8, wherein the location for the user input indicates a path of user input, and wherein the identified type for the user input comprises a scrolling gesture.

11. The method of claim 1, wherein the animated component comprises specified animation behavior for the animated component.

12. The method of claim 1, wherein the GUI comprises a plurality of layers, wherein each layer of the GUI is represented by a node in the hierarchy, and wherein each layer of the GUI represents a logical grouping of components of the GUI.

13. The method of claim 12, wherein the animated component is associated with one of the layers, and wherein the node representing the layer is associated with the set of state variables for the animated component.

14. One or more computer-readable non-transitory storage media embodying software that is operable when executed by a computing device to:

execute, by a main thread, instructions to:

generate a hierarchy comprising a representation of a graphical user interface (GUI), wherein the GUI comprises an animated component; and provide copies of the hierarchy to an input thread and a graphics thread;

asynchronously executing, by the input thread, instructions to:

initialize state variables for the animated component based on a triggering condition for animation of the animated component; and provide information about the initialized state variables to the graphics thread; and asynchronously execute, by the graphics thread, instructions to update the GUI by rendering a first frame of the animation based on the state variables.

15. The media of claim 14, wherein the software is further operable when executed by a computing device to:

asynchronously executing, by the input thread, instructions to:

update, based on a specified frame rate, the state variables; and provide information about the updated state variables to the graphics thread; and asynchronously executing, by the graphics thread, instructions to update, based on the specified frame rate, the GUI by rendering a second frame of the animation based on the updated state variables.

16. The media of claim 15, wherein the software is further operable when executed by a computing device to:
- asynchronously executing, by the input thread, instructions to:
  - update the state variables;
  - determine that the animation is complete;
  - provide information about the updated state variables to the graphics thread; and
- asynchronously executing, by the graphics thread, instructions to update the GUI by rendering a final frame of the animation based on the updated state variables.

17. The media of claim 15, wherein the software is further operable when executed by a computing device to:
- asynchronously executing, by the main thread, instructions to:
  - identify conditions for termination of the animated component; and
  - provide information about the identified conditions to the input thread;
- asynchronously executing, by the input thread, instructions to:
  - process the information about the conditions;
  - update the state variables based on the determined gesture; and
  - provide information about the updated state variables to the graphics thread; and
- asynchronously executing, by the graphics thread, instructions to update the GUI by rendering a termination frame of the animation based on the updated state variables.

18. The media of claim 17, wherein the identified conditions comprise a power status of the computing device, a networking connectivity status of the computing device, a memory status of the computing device, a sensor status of the computing device, a configured preference of the user with respect to animated components, or a configured preference of the user with respect to GUI components having a particular attribute.

19. The media of claim 17, wherein the termination frame comprises a current frame of the animation, a final frame of the animation, an indication that the animation has stopped, an indication that the animation has paused, or a status message.

20. A computing device comprising: one or more processors; and a memory coupled to the processors comprising instructions executable by the processors, the processors being operable when executing the instructions to:
- execute, by a main thread, instructions to:
  - generate a hierarchy comprising a representation of a graphical user interface (GUI), wherein the GUI comprises an animated component; and
  - provide copies of the hierarchy to an input thread and a graphics thread;
- asynchronously executing, by the input thread, instructions to:
  - initialize state variables for the animated component based on a triggering condition for animation of the animated component; and
  - provide information about the initialized state variables to the graphics thread; and
- asynchronously execute, by the graphics thread, instructions to update the GUI by rendering a first frame of the animation based on the state variables.

* * * * *